US010187677B1

(12) United States Patent
Panchaksharaiah et al.

(10) Patent No.: US 10,187,677 B1
(45) Date of Patent: Jan. 22, 2019

(54) SYSTEMS AND METHODS FOR GENERATING AGGREGATED MEDIA ASSETS ON RELATED CONTENT FROM DIFFERENT SOURCES

(71) Applicant: Rovi Guides, Inc., San Carlos, CA (US)

(72) Inventors: Vishwas Sharadanagar Panchaksharaiah, Tumkur District (IN); Vikram Makam Gupta, Bangalore (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 15/710,812

(22) Filed: Sep. 20, 2017

(51) Int. Cl.
*H04N 21/258* (2011.01)
*H04N 21/25* (2011.01)
*H04N 21/235* (2011.01)
*H04N 21/8405* (2011.01)
*H04N 21/4722* (2011.01)
*G10L 15/18* (2013.01)
*G06F 15/18* (2006.01)
*G06F 3/0482* (2013.01)

(52) U.S. Cl.
CPC ....... *H04N 21/25891* (2013.01); *G06F 15/18* (2013.01); *G10L 15/18* (2013.01); *H04N 21/2353* (2013.01); *H04N 21/251* (2013.01); *H04N 21/4722* (2013.01); *H04N 21/8405* (2013.01); *G06F 3/0482* (2013.01)

(58) Field of Classification Search
CPC ......... H04N 21/44008; H04N 21/4722; H04N 21/26603; H04N 21/84; H04N 21/23418; H04N 21/25891; H04N 21/251; H04N 21/2353; H04N 21/8153; H04N 21/8405; G06F 17/3082; G06F 17/30997; G06F 3/0482
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 2002/0120929 A1* | 8/2002 | Schwalb | G06F 17/30817 725/32 |
| 2002/0174430 A1 | 11/2002 | Ellis | |
| 2005/0251827 A1 | 11/2005 | Ellis | |
| 2009/0119704 A1 | 5/2009 | Dimitrova | |
| 2010/0153885 A1* | 6/2010 | Yates | G06F 3/0482 715/841 |
| 2014/0040955 A1* | 2/2014 | McKissick | H04N 5/44513 725/40 |
| 2017/0155965 A1 | 6/2017 | Ward | |

OTHER PUBLICATIONS

PCT International Search Report for International Application PCT/US2018/039106 dated Nov. 15, 2018 (19 pages).

* cited by examiner

*Primary Examiner* — Hai V Tran
(74) *Attorney, Agent, or Firm* — Haley Guiliano LLP

(57) ABSTRACT

Methods and systems for a media guidance application (e.g., implemented on a user device) that generates aggregated media assets on related content from different sources.

20 Claims, 9 Drawing Sheets

SYSTEMS AND METHODS FOR GENERATING AGGREGATED MEDIA ASSETS ON RELATED CONTENT FROM DIFFERENT SOURCES

BACKGROUND OF THE INVENTION

The amount of media available to users in any given media delivery system can be substantial. Users simply have no time to watch all available media from all available sources in order to view the specific content of their choosing. Moreover, if users wish to view only a portion of content (e.g., a news broadcast on a particular topic), the users must sit through all of the content until the specific portion is shown. Consequently, many users desire a form of media guidance through an interface that allows users to efficiently navigate media selections and easily identify media that they desire.

SUMMARY

Accordingly, methods and systems are disclosed herein for a media guidance application (e.g., implemented on a user device) that generates aggregated media assets on related content from different sources. By generating the aggregated media assets on related content from different sources in a single interface, users no longer must watch all available media from all available sources in order to view the specific content of their choosing. Moreover, as the media guidance application aggregates portions of related content from different media assets, users no longer need to sit through an entire media asset until the specific portion that the users wish to view is shown.

For example, the media guidance application may simultaneously monitor a plurality of content streams, within a period of time, for media objects that correspond to a set of keywords that is associated with an aggregated media asset. The media guidance application may identify a media object that corresponds to the set of keywords. The media guidance application may identify a new media object that does not correspond to the set of keywords. The media guidance application may extract a portion of each of the plurality of streaming media assets in which the first and second media object occurred, and generate a first aggregated media asset of the recorded portions, wherein each of the recorded portions is played back in series.

In some aspects, the media guidance application may simultaneously monitor, using control circuitry, a first plurality of content streams for media objects occurring in a first threshold number of the first plurality of content streams at a first threshold frequency within a threshold period of time. For example, the first plurality of content streams may correspond to a plurality of streaming media assets, and the first media object may correspond to video data, image data, audio data, or textual data included with one of the plurality of streaming media assets. In an example where the first plurality of content streams represents a set of four media assets and the first media object represents a term such as "hurricane," the media guidance application would monitor the set of four media assets for the term "hurricane," occurring within a certain time period. In some embodiments, the media guidance application may retrieve from a user profile a preference of a user, compare the preference of the user to the first media object, and identify the first media object in response to determining that the first media object corresponds to the preference. For example, if the user's preference indicates that the user wants to watch a news story about a sports game, the media guidance application may identify the first media object to be anything associated with a sports game through media including, but not limited to, subtitles, story titles, or audio. In some embodiments, the media guidance application may parse each of the first plurality of content streams into segments and individually analyze each of the segments for an occurrence of the first media object. In this case, the media guidance application may scan each of the sets of media assets and create segments of video streams to analyze for an occurrence of the sports game.

The media application may identify, using the control circuitry, a first media object in response to determining that the first media object occurs in the threshold number of the first plurality of content streams at the first threshold frequency within the threshold period of time. For example, if the threshold number is four, the threshold frequency is two, and the threshold period of time is one hour, a video stream may be identified by the media guidance application, if it appears in four media assets, two times each, between 7:00 pm and 8:00 pm. An example of this is a breaking news story which is being covered by multiple evening time news shows. As the story in the breaking news develops, the story reappears on the news show with updates. In some embodiments, the media guidance application may receive user input to the modify the first threshold number, the first threshold frequency, or the threshold period of time.

The media guidance application may designate, in memory, a subset of the first plurality of content streams, in which the first media object occurs, as a second plurality of content streams. For example, the media guidance application may monitor the media assets, which were previously identified as including the news story for an additional media object (e.g., a media object corresponding to an update in the news story).

The media guidance application may simultaneously monitor, using the control circuitry, the second plurality of content streams, during the first threshold period of time, for additional media objects occurring in a second threshold number of the second plurality of content streams at a second threshold frequency. For example, the media guidance application may search for an update to a news story that is reoccurring in a set of media assets and is streamed within a certain period of time after the first story.

The media guidance application may identify, using the control circuitry, a second media object in response to determining that the second media object occurs in the second threshold number of the second plurality of content streams at the second threshold frequency. Adding on the previous example given, where the first threshold number was four, suppose that the second threshold number is two. In addition, the second threshold frequency is four. In this example, a second video stream of an update (e.g., the second media object) to the news story, may be identified as occurring in two of the set of four news channels previously monitored, each recurring four times, within the same hour as the first video stream.

The media guidance application may designate, in memory, a subset of the second plurality of content streams, in which the second media object occurs, as a third plurality of content streams. For example, the media guidance application may monitor the media assets that were previously identified as including the news story for an additional media object (e.g., a media object corresponding to an update in the news story).

The media guidance application may extract, using the control circuitry, a portion in which the first media object and the second media object occurred from each of the third plurality of content streams. For example, the media guidance application may extract the video clips associated with the first media object and second media object respectively from the stored video streams.

The media guidance application may record, using the control circuitry, each of the extracted portions in memory. For example, the media guidance application may store the extracted video clips associated with a general news story, in memory. In this case, each of the extracted portions represents a part of the general news story. In some embodiments, the media guidance application may compare each of the extracted portions, determine whether any two of the extracted portions match, and in response to determining that any two of the extracted portions match, not record one of the two. For example, if the first extracted video clip is of a news story and the second extracted video clip is a re-run of the same news story, only one will be recorded.

The media guidance application may generate, using the control circuitry, a first aggregated media asset of the recorded portions, wherein each of the recorded portions is played back in series. For example, the media guidance application may create a news topic that contains video clips of breaking news updates which occurred within the threshold number, threshold frequency, and threshold period of time. These video clips can be played back to the user one after another.

In some embodiments, the media guidance application may determine a location in the user interface of the first aggregated media asset, generate a first aggregated media asset identifier for the first aggregated media asset, and generate for display, on the display device, the first aggregated media asset identifier in the user interface. For example the user interface generated by the media guidance application may feature a grid of news stories with an identifier that notifies the user of new developments in the story. The new developments detected by the media guidance application in this example, may also be interpreted as a series of breaking news update videos contained within the general news story.

In some embodiments, the media guidance application may simultaneously monitor a third plurality of content streams for the media objects occurring in the first threshold number of the third plurality of content streams at the first threshold frequency within the threshold period of time. The media guidance application may identify a third media object in response to determining that the third media object occurs in the threshold number of the third plurality of content streams at the third threshold frequency within the threshold period of time. The media guidance application may designate, in the memory, a subset of the third plurality of content streams, in which the third media object occurs, as a fourth plurality of content streams. For example, the media guidance application may identify a third video object that frequently appears in a set of media assets in a period of time. Just as in the previous example, the media guidance application may store the set of video streams containing the third media object in memory. The media application may simultaneously monitor the fourth plurality of content streams, during the first threshold period of time, for additional media objects occurring in a fourth threshold number of the fourth plurality of content streams at a fourth threshold frequency. The media application may identify a fourth media object in response to determining that the fourth media object occurs in the fourth threshold number of the fourth plurality of content streams at the fourth threshold frequency. The media application may designate, in the memory, a subset of the fourth plurality of content streams, in which the fourth media object occurs, as a fifth plurality of content streams. In this case, the media guidance application may identify a video clip of a news story update reoccurring in the set of media assets and store the set of the video streams in memory. The media application may extract a portion in which the third media object and the fourth media object occurred from each of the fifth plurality of content streams. For example, the media application may extract a video clip that describes a different news story. The media application may record, in the memory, each of the portions extracted from the fifth plurality of content streams. The media application may generate a second aggregated media asset of the recorded portions extracted from the fifth plurality of content streams (i.e., about the different news story), wherein each of the recorded portions extracted from the fifth plurality of content streams is played back in series, and generate for simultaneous display, on a display device, the first aggregated media asset and the second aggregated media asset in a user interface. For example, the media guidance application may record video clips of breaking news stories unrelated to those in the first aggregated media asset, and add them to the second aggregated media asset. For example, the second general news story may relate to a United States election night. The portions, in this case video clips, would be breaking news developments of the election, such as a clip about the beginning of the voting process, a clip about a candidate gaining votes, and a clip about the candidate winning the election. These clips would be displayed on the user interface as a part of the second news story and could be played back one after another. The second news story would be alongside the first news story the user interface.

In some embodiments, the media guidance application may receive a user request to simultaneously monitor the first plurality of content streams for the first media object and, in response to the user request, set the first threshold number equal to one. For example, the media guidance application may require only a single media asset to feature a media object matching the user request in order to generate an media asset corresponding to the media object in the user interface.

In some embodiments, the media guidance application may receive a user request to simultaneously monitor the first plurality of content streams for the first media object and, in response to the user request, set the first threshold frequency equal to one. For example, the media guidance application may require only a single instance of a media object matching the user request in order to generate a media asset corresponding to the media object in the user interface.

In some aspects, the media guidance application may simultaneously monitor, using control circuitry, a first plurality of content streams, within a threshold period of time, for media objects that correspond to a first set of keywords, wherein the first set of keywords corresponds to a first aggregated media asset. For example, the first plurality of content streams may correspond to a plurality of streaming media assets, and the first media object may correspond to video data, image data, audio data, or textual data included with one of the plurality of streaming media assets. In some embodiments, the media guidance application may receive a user request to simultaneously monitor the first plurality of content streams for the first media object, and in response to the user request, determine the first set of keywords. For example, the media guidance application may monitor media assets for streams of a specific news update in a general news story. In this case, the general news topic represents the first aggregated media asset. The first media object can represent "devastating hurricane in Houston causes flood" through any medium including, but not limited to, subtitles, news title, video, and audio. If the user requests to monitor a set of video streams for the first media object, "devastating hurricane in Houston causes flood," the media guidance application may monitor news channel video streams from CNN and NBC between 10:00 pm and 11:00 pm, which have news updates about the general news story "Hurricane Harvey." This general news story can be associated to keywords such as "hurricane," "devastating," "Houston," and "flood." In some embodiments, the media guidance application further comprises parsing each of the first plurality of content streams into segments and individually analyzing each of the segments for an occurrence of the first media object.

The media guidance application may identify, using the control circuitry, a first media object in response to determining that the first media object corresponds to the first set of first keywords. For example, if the keywords are "devastating hurricane," "Houston," and "flood," the media guidance application may determine that the first media object, "devastating hurricane in Houston causes flood" corresponds to the first set of keywords. The video stream associated to the first set of keywords may be of breaking news informing viewers that the "devastating hurricane" is approaching the city of Houston and is expected to cause devastating flooding issues. In some embodiments, the media guidance application may comprise retrieving from a user profile a preference of a user, compare the preference of the user to the first media object, and identify the first media object in response to determining a correspondence. For example, if the user prefers watching video streams depicting hurricanes, the first media object identified by the media guidance application may be a video stream about Hurricane Harvey.

The media guidance application may designate, in memory, a subset of the first plurality of content streams, in which the first media object occurs, as a second plurality of content streams. For example, the media guidance application may monitor the media assets that were previously identified as including the news story for an additional media object (e.g., a media object corresponding to an update in the news story).

The media guidance application may simultaneously monitor the second plurality of content streams, during the threshold period of time, for additional media objects that do not correspond to the first set of keywords. For example, the media guidance application may begin monitoring the media assets where the first media object, "devastating hurricane in Houston causes flood," occurred for additional media objects such as "heavy rainfall" or "injured." These additional media objects do not correspond to the first set of keywords. In some embodiments, the media guidance application may determine a new set of keywords for each of the additional media objects. For example, upon monitoring and identifying a video clip about the hurricane, the media guidance application may determine keywords such as "devastating hurricane," "Houston," and "evacuation." The media guidance application may compare the set of keywords for each of the additional media objects to the first set of keywords to determine a keyword of the set of keywords for each of the additional media objects that does not correspond to the first set of keywords. In other words, the media guidance application may determine that the first set of keywords includes "devastating hurricane," "Houston," and "flooding," and a second set of keywords includes "devastating hurricane," "Houston," and "evacuation." The keyword "evacuation" does not appear in the first set of keywords.

The media guidance application may identify, using the control circuitry, a second media object in response to determining that the second media object does not correspond to the first set of keywords. For example, if the second media object is "emergency in Houston," and the first set of keywords is "devastating hurricane," "Houston," and "flooding," the media guidance application may determine that the second media object does not correspond to the first set of keywords.

The media guidance application may designate, in the memory, a subset of the second plurality of content streams, in which the second media object occurs, as a third plurality of content streams. For example, the media guidance application may monitor the media assets, which were previously identified as including the news story for an additional media object (e.g., a media object corresponding to an update in the news story).

The media guidance application may extract, using the control circuitry, a portion in which the first media object and the second media object occurred from each of the third plurality of content streams. For example, the media guidance application may extract the video clips associated to the first media object "devastating hurricane in Houston causes flood," and the second media object "emergency in Houston," keywords, respectively, from the monitored media assets.

The media guidance application may record, using the control circuitry, each of the extracted portions in the memory. In some embodiments, the media guidance application may compare each of the extracted portions, determine whether any two of the extracted portions match, and in response to determining that any two of the extracted portions match, not record one of the two. For example, if the first portion is a video clip associated to "devastating hurricane" and the second portion is a video clip associated to "emergency in Houston," but the second portion is a re-run of the same news story, only one of the portions will be recorded.

The media guidance application may generate, using the control circuitry, a second aggregated media asset of the recorded portions, wherein each of the recorded portions is played back in series. For example, the second media asset would consist of video clips of updates in the general news story "Hurricane Harvey."

In some embodiments, the media guidance application may generate for simultaneous display, on a display device, the first aggregated media asset and the second aggregated media asset in a user interface. In addition, the media guidance application may determine a location in the user interface of the first aggregated media asset, generate a first aggregated media asset identifier for the first aggregated media asset, and generate for display, on the display device, the first aggregated media asset identifier in the user interface. For example, the user interface generated by the media guidance application may feature a grid of news stories with an identifier that notifies the user of the title of the general news story. The second media asset would contain video clips of developments in the general news story. The new developments detected by the media guidance application may also be interpreted as a series of breaking news update videos contained within the general news story. For example, if the story is "Hurricane Harvey," the smaller updates may include breaking news of the hurricane developing in the ocean, arriving near the United States, and making impact, respectively.

In some embodiments, the media guidance application may simultaneously monitor the first plurality of content streams for media objects occurring in a first threshold number of the first plurality of content streams at a first threshold frequency within the threshold period of time. The media guidance application may also identify the first media object in response to determining that the first media object occurs in the threshold number of the first plurality of content streams at the first threshold frequency within the threshold period of time, and the media guidance application may extract a portion in which the first media object occurred from each of the first plurality of content streams. The media guidance application may record each of the extracted portions in memory, and the media guidance application may generate the first aggregated media asset from recorded portions. For example, the media guidance application may look only for video streams that occur in a certain period of time, on a selected number of channels, and whose news stories appear frequently. Once these requirements have been met, the media guidance application may record the extracted video clips from those channels.

In some embodiments, the media guidance application may receive a user input to modify the first threshold number, the first threshold frequency, or the threshold period of time. For example, the user may indicate that he/she wants to see news stories only from two media assets between 11:00 pm and 11:30 pm.

It should be noted that the systems and/or methods described above may be applied to, or used in accordance with other systems, methods, and/or apparatuses in this disclosure.

BRIEF DESCRIPTIONS OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
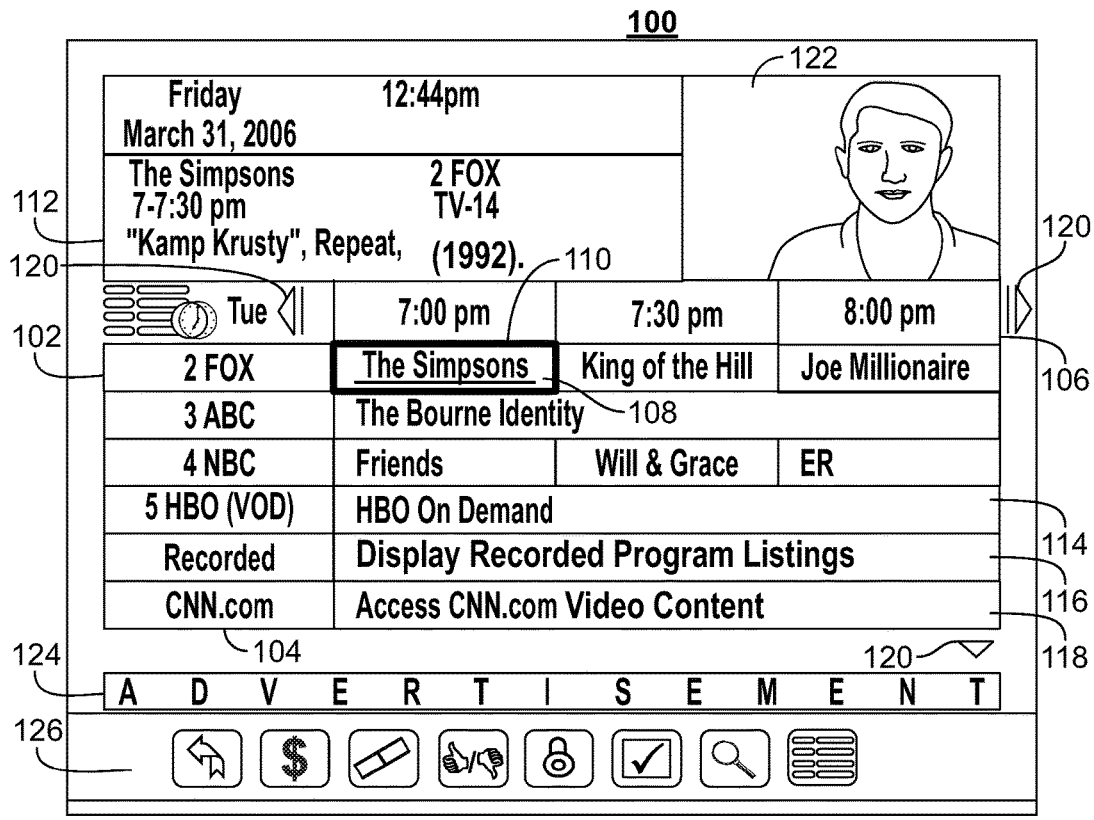
FIGS. 1 and 2 show illustrative display screens that may be used to provide media guidance application listings in accordance with an embodiment of the disclosure.

Methods and systems are disclosed herein for a media guidance application (e.g., implemented on a user device) that generates aggregated media assets on related content from different sources. An application that provides an interface that allows users to efficiently navigate media selections and easily identify media that they may desire is referred to herein as an interactive media guidance application or, sometimes, a guidance application. By generating the aggregated media assets on related content from different sources in a single interface, users no longer must watch all available media from all available sources in order to view the specific content of their choosing. Moreover, as the media guidance application aggregates portions of related content from different media assets, users no longer need to sit through all of the media asset until the specific portion is shown.

For example, the media guidance application may simultaneously monitor a plurality of content streams, within a period of time, for media objects that correspond to a set of keywords that is associated with an aggregated media asset. As referred to herein, "an aggregated media asset" is a collection of media such as video, audio, text, etc. The aggregated media asset may comprise portions of other media assets (e.g., clips). Each portion may come from the same or a different media source. Furthermore, each portion may be played back one at a time (e.g. in series) or played back simultaneously (e.g., in parallel) in separate windows.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, a "media object" may be any data used to identify or categorize a media asset or a portion of a media asset and/or distinguish the media asset and/or a portion of the media asset from another media asset and/or portion of a media asset. For example, a media object may be video, audio, image or textual data. For example, a media object may be a frame of a video (or an image appearing in a frame of a video). The media object may be an audio segment (e.g., corresponding to a word spoken by a character in a media asset). In another example, the media object may be textual data such as a keyword in metadata describing a media asset or a portion of a media asset, or a keyword (or group of keywords) included in subtitle data).

As referred to herein, a "keyword" may be any data used to identify a media object, media asset, or a portion of a media asset and/or distinguish one media object, media asset, and/or a portion of media asset from another media object, media asset, and/or portion of a media asset. For example, the keyword may be the name of a person, location, type of story, etc., that is closely related to the aggregated media asset. In some embodiments, the media guidance application may identify a media object that corresponds to the set of keywords. For example, if the keywords are textual data, the media guidance application may monitor received media assets for textual data in the media assets (e.g., words in subtitles of a media asset) that correspond to the keywords.

To detect the occurrence (or lack thereof), the media guidance application may use one or more detection modules. A detection module of the media guidance application may include one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video, audio, and textual data. For example, the media guidance application may receive a media asset in the form of a video of the actions of a user. The video may include a series of frames. For each frame of the video, the media guidance application may use an object recognition module to determine the characteristics associated with each frame (or the media assets as a whole) of the video to determine whether or not a particular media object (e.g., an image in a frame of the video, a word in the subtitle data of the video, etc.) occurs.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data. For example, the content-recognition module may analyze audio data to determine whether or not a media object is present (e.g., whether or not a character or a speaker or a news broadcaster in the media asset has spoken a keyword). Furthermore, the content-recognition module may analyze video and/or audio data to determine whether or not a user is performing an activity, the progress of the user in the activity, and/or a condition associated with the activity.

In addition, the media guidance application may use multiple types of optical character recognition and/or fuzzy logic, for example, when comparing multiple data fields (e.g., as contained in databases described below). For example, after the content-recognition module or algorithm translates video and/or audio recordings into text, the media guidance application may compare the translated text with keywords found in a database to determine whether or not the translated text corresponds to a set of keywords for an aggregated media asset.

The media guidance application may arrange the text into data fields and cross-reference the data fields with other data fields (e.g., in a lookup table database) corresponding to possible values associated with a keyword in a media asset. The system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, other data, and/or any other information required for the function of the embodiments described herein. Furthermore, the data fields could contain values (e.g., the data fields could be expressed in binary or any other suitable code or programming language).

In some embodiments, the media guidance application may simultaneously monitor, using control circuitry, a first plurality of content streams for media objects occurring in a first threshold number of the first plurality of content streams at a first threshold frequency within a threshold period of time. For example, the media guidance application may monitor the content streams for the occurrence of a particular word a particular number of times.

The threshold number indicates a minimum number of the plurality of content streams to monitor. The threshold frequency is the minimum number of instances of a media object to detect. The threshold period of time indicates a block of time in which the media object should be detected. For example, the first plurality of content streams may correspond to a plurality of streaming media assets, and the first media object may correspond to video data, image data, audio data, or textual data included with one of the plurality of streaming media assets. In an example where the first plurality of content streams represents a set of four media assets and the first media object represents a term such as "hurricane," the media guidance application would monitor the set of four media assets for the term "hurricane," occurring within a certain time period.

In some embodiments, the media guidance application may retrieve from a user profile a preference of a user, compare the preference of the user to the first media object, and identify the first media object in response to determining that the first media object corresponds to the preference. For example, if the user's preference indicates that the user wants to watch a news story about a sports game, the media guidance application may identify the first media object to be anything associated to a sports game through media including, but not limited to, subtitles, story titles, video, and audio.

In some embodiments, the media guidance application may parse each of the first plurality of content streams into segments and individually analyze each of the segments for an occurrence of the first media object. This analysis may be done by using machine learning and natural language processing. Video data, audio data, and textual data may be extracted from the plurality of content streams to determine an occurrence of the first media object. Textual data may be extracted in parts and compared to the first media object to determine whether the textual data corresponds. For example, if a subtitle reads "a mistake in the Oscars Best Motion Picture," an extracted part may simply be "Oscars Best Motion Picture." If the first media object is "Oscars Best Motion Picture," the media guidance application can identify that the extracted part and the first media object correspond. Audio data that is extracted by the media guidance application may be analyzed using speech recognition to convert voices inside the audio data to text. This text can be analyzed using natural language processing to determine a correspondence with the first media object. For example, if the plurality of content streams feature a video stream of a news report about the award for Best Motion Picture being misread at the Oscars, the news reporter's voice can be extracted and converted to text. Natural language processing can be applied to the textual data to determine whether the media object corresponds.

The media application may identify, using the control circuitry, a first media object in response to determining that the first media object occurs in the threshold number of the first plurality of content streams at the first threshold frequency within the threshold period of time. For example, if the threshold number is four, the threshold frequency is two, and the threshold period of time is one hour, a video stream may be identified by the media guidance application, if it appears in four media assets, in at least two instances between 7:00 pm and 8:00 pm. An example of this is a breaking news story which is being covered by multiple evening news shows. As the story in the breaking news develops, the story reappears on the news show with updates. In some embodiments, the media guidance application may receive user input to the modify the first threshold number, the first threshold frequency, or the threshold period of time.

The media guidance application may designate, in memory, a subset of the first plurality of content streams, in which the first media object occurs, as a second plurality of content streams. For example, the media guidance application may monitor the media assets that were previously identified as including the news story for an additional media object (e.g., a media object corresponding to an update in the news story). Suppose the media guidance application is monitoring for the occurrence of the first media object "Oscars Best Motion Picture" in the first plurality of content streams including CNN News, ABC News, and Fox News. It then determines that the first media object is found in CNN News and ABC News, but not in Fox News. In response, the media guidance application may identify CNN News and ABC News as a second plurality of content streams to focus on for additional media objects.

The media guidance application may simultaneously monitor, using the control circuitry, the second plurality of content streams, during the first threshold period of time, for additional media objects occurring in a second threshold number of the second plurality of content streams at a second threshold frequency. For example, the media guidance application may search for an update to a news story that is reoccurring in a set of media assets and is streamed within a certain period of time after the first story. If the first news story is about the Oscar Award for Best Motion Picture being misread, the next update may involve the aftermath and reactions of people upon realizing that the award was misread.

The media guidance application may identify, using the control circuitry, a second media object in response to determining that the second media object occurs in the second threshold number of the second plurality of content streams at the second threshold frequency. Adding on the previous example given, suppose the second plurality of content streams includes CNN News and ABC News. The media guidance application may search these two news streams for additional updates to the Oscars story. The media guidance application may then find a news story update about the Oscars that matches a second media object such as "Oscars Error in Announcement."

The media guidance application may designate, in the memory, a subset of the second plurality of content streams, in which the second media object occurs, as a third plurality of content streams. For example, the media guidance application may monitor the media assets that were previously identified as including the Oscars news story for an additional media object (e.g., a media object corresponding to an update in the news story). Revisiting the previous example, suppose the news story update is found in CNN News and not in ABC News; the media guide application may identify CNN News as the third plurality of content streams.

The media guidance application may extract, using the control circuitry, a portion in which the first media object and the second media object occurred from each of the third plurality of content streams. For example, the media guidance application may extract the news video clips associated to the first media object, "Oscars Best Motion Picture," and second media object "Oscars Error in Announcement" respectively, from the CNN News video stream.

The media guidance application may record, using the control circuitry, each of the extracted portions in the memory. In some embodiments, the media guidance application may compare each of the extracted portions, determine whether any two of the extracted portions match, and in response to determining that any two of the extracted portions match, not record one of the two. Determining whether the portions match may involve extracting video data and audio data from the extracted portions and comparing them. For example, if the first extracted portion is a video clip of a news story and the second extracted portion is a video clip re-run of the same news story, the media guidance application may determine that the video data and audio data from both extracted portions are the same. In response, only one of the video clips will be stored in memory.

The media guidance application may generate, using the control circuitry, a first aggregated media asset of the recorded portions, wherein each of the recorded portions is played back in series. For example, the video clips of news stories associated to the Oscars can be grouped under a larger story, "Oscars Mishap." This larger story is associated to the first aggregated media asset since it is made up of smaller news stories relating to it. The media guidance application may play back these video clips about the Oscars one after another. It can be noted that the aggregated media asset is not limited to separate video clips of news story updates. For example, the video clips of the news stories may also be spliced together.

In some embodiments, the media guidance application may determine a location in the user interface of the first aggregated media asset, generate a first aggregated media asset identifier for the first aggregated media asset, and generate for display, on the display device, the first aggregated media asset identifier in the user interface. For example, the user interface generated by the media guidance application may add additional portions from a plurality of content streams to the first aggregated media asset. Suppose the Oscars news story encounters further developments such as a media object, "apology issued for mistake." This media object would be monitored and an associated portion may be added to the "Oscars Mishap" first aggregated media asset. The first aggregated media asset identifier would indicate to the user that a news update has been added.

Machine learning and natural language processing may be used to identify the further developments in a larger story, such as "Oscars Mishap." Suppose a plurality of content streams including CNN News and ABC News is monitored.

Video data, audio data, and textual data may be extracted from these news sources. The extracted video data may contain video frames similar to the video frames of the video clips in the aggregated media asset. However, new camera shots and appearances of different characters or speakers may indicate that the extracted video data features a new development associated to the aggregated media asset. Extracted audio data can also be analyzed. Suppose a different news reporter is speaking about a new development in the "Oscar Mishap" evolving story; the different voice can indicate that the development is new. Natural language processing can be applied to extracted textual data to determine similarities between the video clips in the aggregated media asset and the new media asset. The extracted audio data can also be converted to textual data using speech recognition. Natural language processing can then be applied to determine similarities between the video clips in the aggregated media asset and the new media asset. The purpose of this process in this example, is to determine whether new words are used to describe a new event in the news story.

In some embodiments, the media guidance application may simultaneously monitor a third plurality of content streams for the media objects occurring in the first threshold number of the third plurality of content streams at the first threshold frequency within the threshold period of time. The media guidance application may identify a third media object in response to determining that the third media object occurs in the threshold number of the third plurality of content streams at the third threshold frequency within the threshold period of time. The media guidance application may designate, in the memory, a subset of the third plurality of content streams, in which the third media object occurs, as a fourth plurality of content streams. For example, the media guidance application may identify a third video object that frequently appears in a set of media assets in a period of time. Just as in the previous example, the media guidance application may store the set of video streams containing the third media object in memory. The media application may simultaneously monitor the fourth plurality of content streams, during the first threshold period of time, for additional media objects occurring in a fourth threshold number of the fourth plurality of content streams at a fourth threshold frequency. The media application may identify a fourth media object in response to determining that the fourth media object occurs in the fourth threshold number of the fourth plurality of content streams at the fourth threshold frequency. The media application may designate, in the memory, a subset of the fourth plurality of content streams, in which the fourth media object occurs, as a fifth plurality of content streams. In this case, the media guidance application may identify a video clip of a news story update reoccurring in the set of media assets and store a set of the video streams in memory. The media application may extract a portion in which the third media object and the fourth media object occurred from each of the fifth plurality of content streams. For example, the media application may extract a video clip that describes a different news story. The media application may record, in the memory, each of the portions extracted from the fifth plurality of content streams. The media application may generate a second aggregated media asset of the recorded portions extracted from the fifth plurality of content streams (i.e., about the different news story), wherein each of the recorded portions extracted from the fifth plurality of content streams is played back in series, and generate for simultaneous display, on a display device, the first aggregated media asset and the second aggregated media asset in a user interface. For example, the media guidance application may record video clips of related breaking news stories and add them to the second aggregated media asset. This process parallels the one described for generating the first aggregated media asset. However, in this case, the third media object may be unrelated to the first media object. Suppose the second general news story relates to the "United States Election Night." The portions (e.g., video clips) would be breaking news developments of the election such as a clip about the voting process beginning, a clip about a candidate gaining votes, and a clip about the candidate winning the election. These clips are not related to the Oscars news stories and would thus be displayed on the user interface as a part of the second aggregated media asset and could be played back one after another. After this point, the user interface in this example would display two aggregated media assets. The first aggregated media asset would consist of video clips about the "Oscars Mishap" and the second aggregated media asset would consist of video clips about "United States Election Night."

In some embodiments, the user may select a specific content stream from the plurality of content streams associated to the extracted portions in the aggregated media asset. In response, only the extracted portions associated to the specific content stream selected by the user will play back in series. For example, if the user selects CNN as the content stream, only news stories about the "Oscar Mishap" from CNN will be played back.

In some embodiments, the user may select a specific extracted portion from the aggregated media asset, and all similar portions from different content streams will be played back in series. For example, the user may pick an event in the "Oscar Mishap" news story such as "Moonlight announced as true best picture." Multiple content streams such as CNN, ABC, and BBC could cover the same story. In this case, all versions of the story from each content stream will be played back in series.

In some embodiments, the media guidance application may receive a user request to simultaneously monitor the first plurality of content streams for the first media object and in response to the user request, set the first threshold number equal to one. For example, the media guidance application may require only a single media asset to feature a media object matching the user request in order to generate a media asset corresponding to the media object in the user interface. Suppose the media object is "Oscars Best Motion Picture." Multiple news sources may cover this topic, such as CNN, ABC, and BBC. If the first threshold number is set to one, only one news source stream will be monitored for "Oscars Best Motion Picture."

In some embodiments, the media guidance application may receive a user request to simultaneously monitor the first plurality of content streams for the first media object and in response to the user request, set the first threshold frequency equal to one. For example, the media guidance application may search for the media object "Oscars Best Motion Picture" and encounter multiple occurrences in the plurality of content streams. Some occurrences may be brief mentions of the topic in an unrelated media asset, while other media assets will focus heavily on the media object (i.e., give more importance). When the threshold frequency is set to one, any media asset that contains an occurrence of the media object will be identified. When the threshold frequency is greater, the media object must occur more frequently in a media asset for the media asset to be identified.

In some embodiments, the media guidance application may simultaneously monitor, using control circuitry, a first plurality of content streams, within a threshold period of time, for media objects that correspond to a first set of keywords, wherein the first set of keywords corresponds to a first aggregated media asset. A set of keywords may consist of terms, names, phrases, etc., that are closely related to the aggregated media asset. For example, keywords of the "Oscar Mishap" may include "Oscars," "best picture," "mistake," "Moonlight," and "La La Land" because they reappear frequently in the content associated to the "Oscar Mishap." For example, these keywords may appear in the subtitles of a video stream, in news headlines, and in audio.

The first plurality of content streams may correspond to a plurality of streaming media assets, and the first media object may correspond to video data, image data, audio data, or textual data included with one of the plurality of streaming media assets. In some embodiments, the media guidance application may receive a user request to simultaneously monitor the first plurality of content streams for the first media object, and in response to the user request, determine the first set of keywords. For example, some news stories are covered as they break. Suppose there is a breaking news story about the award for Best Motion Picture being misread at the Oscars. The media guidance application may monitor media assets for streams of a specific news update in a general news story. In this case, the general news topic is "Oscars Mishap" and is associated with the first aggregated media asset. The first media object can represent "Oscars Best Motion Picture" through any medium including, but not limited to, subtitles, news title, video, and audio. For example, these words may be mentioned in the audio of the video stream by a reporter. If the user requests to monitor a set of video streams for the first media object "Oscars Best Motion Picture," the media guidance application may monitor news channel video streams from CNN and NBC between 10:00 pm and 11:00 pm, which have news updates about the general news story "Oscars Mishap." This general news story can be associated to keywords such as "Oscars," "best picture," "error," and "embarrassing."

In some embodiments, the media guidance application may parse each of the first plurality of content streams into segments and individually analyze each of the segments for an occurrence of the first media object. For example, a video stream may feature the breaking news story about the Oscars, a commercial, another news story, and then an update about the situation at the Oscars. The media guidance application would parse the plurality of content streams into segments and analyze each one to determine whether the first media object, "Oscars Best Motion Picture" occurs in the segment.

The media guidance application may identify, using the control circuitry, a first media object in response to determining that the first media object corresponds to the first set of first keywords. For example, if the keywords are "Oscars," "best picture," "error," and "embarrassing," the media guidance application may determine that the first media object, "Oscars Best Picture Embarrassing Error" corresponds to the keywords. The video stream associated to the first set of keywords may be of breaking news informing viewers that the wrong movie was announced as the recipient for Best Motion Picture. In some embodiments, the media guidance application may retrieve from a user profile a preference of a user, compare the preference of the user to the first media object, and identify the first media object in response to determining a correspondence. For example, if the user prefers watching video streams depicting awards, the first media object identified by the media guidance application may be a video stream about an award show. In some embodiments, the user preference may indicate the plurality of content streams to monitor. For example, if the user prefers watching CNN News, the media guidance application may monitor CNN News for media objects.

The media guidance application may designate, in memory, a subset of the first plurality of content streams, in which the first media object occurs, as a second plurality of content streams. For example, the media guidance application may monitor the media assets that were previously identified as including the news story for an additional media object (e.g., a media object corresponding to an update in the news story). Suppose the media guidance application is monitoring for the occurrence of the first media object "Oscars Best Motion Picture" in the first plurality of content streams including CNN News, ABC News, and Fox News. It then determines that the first media object is found in CNN News and ABC News, but not in Fox News. In response, the media guidance application may identify CNN News and ABC News as a second plurality of content streams to focus on for additional media objects.

The media guidance application may simultaneously monitor the second plurality of content streams, during the threshold period of time, for additional media objects that do not correspond to the first set of keywords. For example, additional media objects may be "Oscars apology for mistake," "Aftermath of Oscars error," and "'Moonlight' is true best picture." If the first set of keywords are "Oscars," "best picture," "error," and "embarrassing," the media guidance application may determine that the additional media objects do not correspond to the first set of keywords. Since the second plurality of content streams is monitored during the threshold period of time, it is likely that additional media objects, such as the ones mentioned, may be identified that further the breaking news story with new developments. In some embodiments, the media guidance application may determine a new set of keywords for each of the additional media objects. For example, the additional media object "Aftermath of Oscars error," may be associated to a set of keywords such as "'Moonlight' cast," "Oscars," "error," and "best picture." The media guidance application may compare the set of keywords for each of the additional media objects to the first set of keywords to determine a keyword of the set of keywords for each of the additional media objects that does not correspond to the first set of keywords. Revisiting our example, the set of keywords determined for the additional media object includes the keyword "'Moonlight' cast," which does not appear in the first set of keywords. Since a majority of the keywords correspond to both the first set of keywords and the additional set of keywords, the media guidance application can determine that the additional media object represents an update to the breaking news story, "Oscars Mishap."

In some embodiments, keywords are determined by using machine learning and natural language processing. Video data, audio data, and textual data may be extracted from the plurality of content streams to determine a set of keywords associated to a media object. Textual data may be extracted to determine words that frequently appear. These words may represent greater importance or relevance to the topic. Natural language processing can then be applied on the textual data to determine synonyms of words and in response, determine keywords. Audio data that is extracted by the media guidance application may be analyzed using speech recognition to convert voices inside the audio data to text. This text can be analyzed using natural language processing to determine the set of keywords as well. For example, if the plurality of content streams feature a video stream of a news report about the award for Best Motion Picture being misread at the Oscars, the news reporter's voice can be extracted and converted to text.

The media guidance application may identify, using the control circuitry, a second media object in response to determining that the second media object does not correspond to the first set of keywords. For example, after monitoring multiple content streams for additional media objects, the media guidance application may identify the second media object as one of the additional media objects that does not correspond to the first set of keywords. In the previous example, the additional media object "Aftermath of Oscars error" included the keyword "'Moonlight' cast," which was not a part of the first set of keywords. Therefore, "Aftermath of Oscars error" does not correspond to the first set of keywords and may be identified as the second media object.

The media guidance application may designate, in the memory, a subset of the second plurality of content streams, in which the second media object occurs, as a third plurality of content streams. For example, the media guidance application may monitor the media assets, which were previously identified as including the news story for an additional media object (e.g., a media object corresponding to an update in the news story). Revisiting the previous example, suppose the news story update is found on CNN News and not ion ABC News; the media guide application may identify CNN News as the third plurality of content streams.

The media guidance application may extract, using the control circuitry, a portion in which the first media object and the second media object occurred from each of the third plurality of content streams. For example, the media guidance application may extract the video clips associated to the first media object, "Oscars Best Picture Embarrassing Error," and the second media object, "Aftermath of Oscars error," keywords, respectively, from the monitored media assets.

The media guidance application may record, using the control circuitry, each of the extracted portions in the memory. In some embodiments, the media guidance application may compare each of the extracted portions, determine whether any two of the extracted portions match, and, in response to determining that any two of the extracted portions match, not record one of the two. Determining whether the portions match may involve extracting video data and audio data from the extracted portions and comparing them. For example, if the first extracted portion is a video clip of a news story and the second extracted portion is a video clip re-run of the same news story, the media guidance application may determine that the video data and audio data from both extracted portions is the same. In response, only one of the video clips will be stored in memory.

The media guidance application may generate, using the control circuitry, a second aggregated media asset of the recorded portions, wherein each of the recorded portions is played back in series. For example, the second aggregated media asset can contain video clips of the breaking news updates in the general news story "Oscar Mishap." It should be noted that the recorded portions can be played back one after another, or be spliced together. The user may also select the recorded portion he/she wishes to view.

In some embodiments, the media guidance application may generate for simultaneous display, on a display device, the first aggregated media asset and the second aggregated media asset in a user interface. In addition, the media guidance application may determine a location in the user interface of the first aggregated media asset, generate a first aggregated media asset identifier for the first aggregated media asset, and generate for display, on the display device, the first aggregated media asset identifier in the user interface. For example, the user interface generated by the media guidance application may feature a grid of news stories with an identifier that notifies the user of the title of the general news story. The second media asset would contain video clips of developments in the general news story. The new developments detected by the media guidance application may be interpreted as a series of breaking news update videos contained within the general news story.

In some embodiments, the media guidance application may simultaneously monitor the first plurality of content streams for media objects occurring in a first threshold number of the first plurality of content streams at a first threshold frequency within the threshold period of time. The media guidance application may also identify the first media object in response to determining that the first media object occurs in the threshold number of the first plurality of content streams at the first threshold frequency within the threshold period of time, and the media guidance application may extract a portion in which the first media object occurred from each of the first plurality of content streams. The media guidance application may record each of the extracted portions in memory, and the media guidance application may generate the first aggregated media asset from the recorded portions. The threshold number indicates a minimum number of the plurality of content streams to monitor. The threshold frequency is the minimum number of instances of a media object to detect. The threshold period of time indicates a block of time in which the media object should be detected. As an example, if the first media object "Oscars Best Picture Embarrassing Error" appears in a threshold number of two media assets (i.e., video streams), in a threshold period of one hour and occurs in the more than the threshold frequency of four times, the media guidance application may identify it as the first media object. Once this requirement has been met, the media guidance application may record the extracted video clips from those channels.

In some embodiments, the media guidance application may receive a user input to modify the first threshold number, the first threshold frequency, or the threshold period of time. For example, the user may indicate that he/she wants to see news stories only from two media assets between 11:00 pm and 11:30 pm.

In some embodiments, the media guidance application may use a mathematical distribution of keywords to determine when to stop recording each of extracted portions of the plurality of content streams. The mathematical distribution represents a keyword frequency of a set of keywords over a period of time. For example, in terms of the general news story "Oscar Mishap," the first extracted portion related to the first media object may be a video clip with several words associated to it. These words can be determined by using natural language processing on textual data such as subtitles. They can also be determined by using speech recognition and converting audio data to textual data. From these words, a set of keywords is determined. The media guidance application may then map out when the keywords were used in the extracted portion over a period of time. Consider the first media object in the general news story "Oscars Mishap." The news reporter may introduce the news story by using the keyword "Oscars" two times in the first minute. Then the news reporter may use the keyword "Oscars" five times in the following minute. The news reporter may conclude the report in the third minute, using the keyword "Oscars" only once. In this example, the frequency of use of the keyword "Oscars" may resemble a bell curve over time. Accordingly, the media guidance application may stop recording the extracted portion once it identifies that the set of keywords follow the mathematical distribution. In some embodiments, the media guidance application may generate an aggregated mathematical distribution associated to the aggregated media assets. The aggregated mathematical distribution represents a keyword frequency of all sets of keywords over a period of time associated to the extracted portions in the aggregated media asset.

In some embodiments, the media guidance application may determine the importance of an extracted portion based on the frequency of keywords in the extracted portion. For example, in the general news story "Oscars Mishap," if an extracted portion features the keyword "Oscars" once, and another extracted portion features the keyword "Oscars" ten times, the latter would be considered more relevant to the general news story "Oscars Mishap," and therefore more important.

Figure 2:
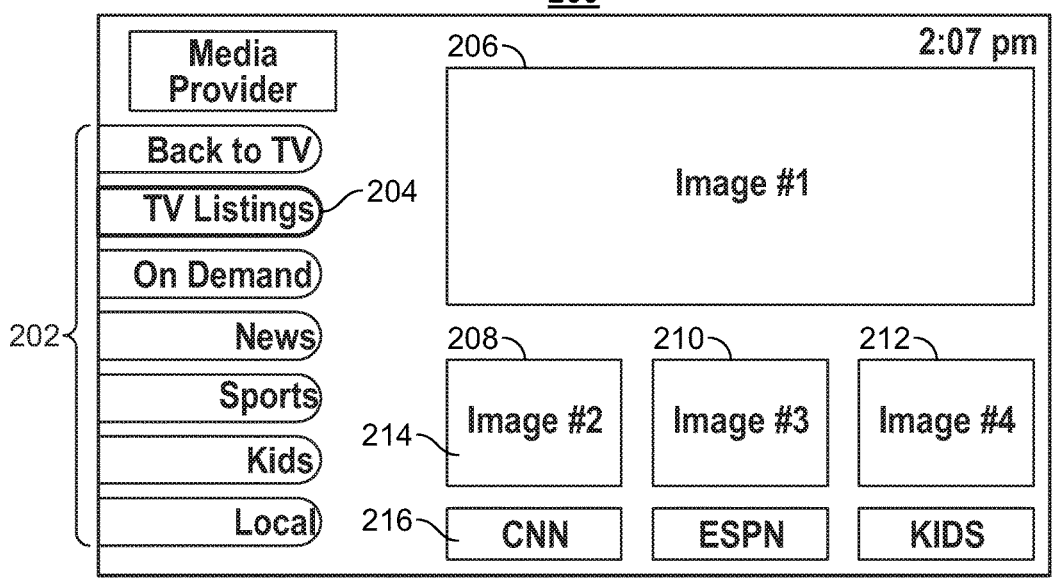

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
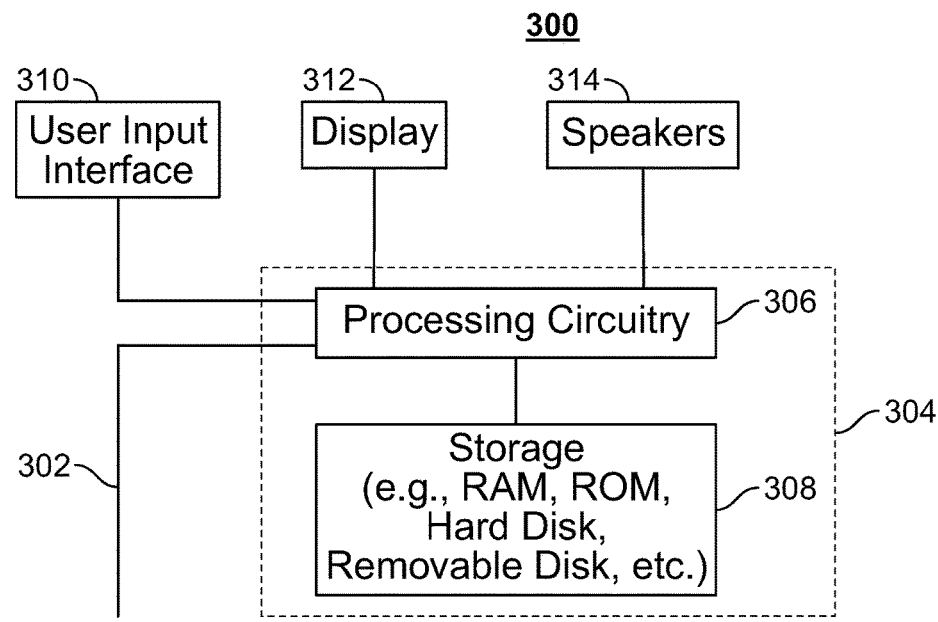
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
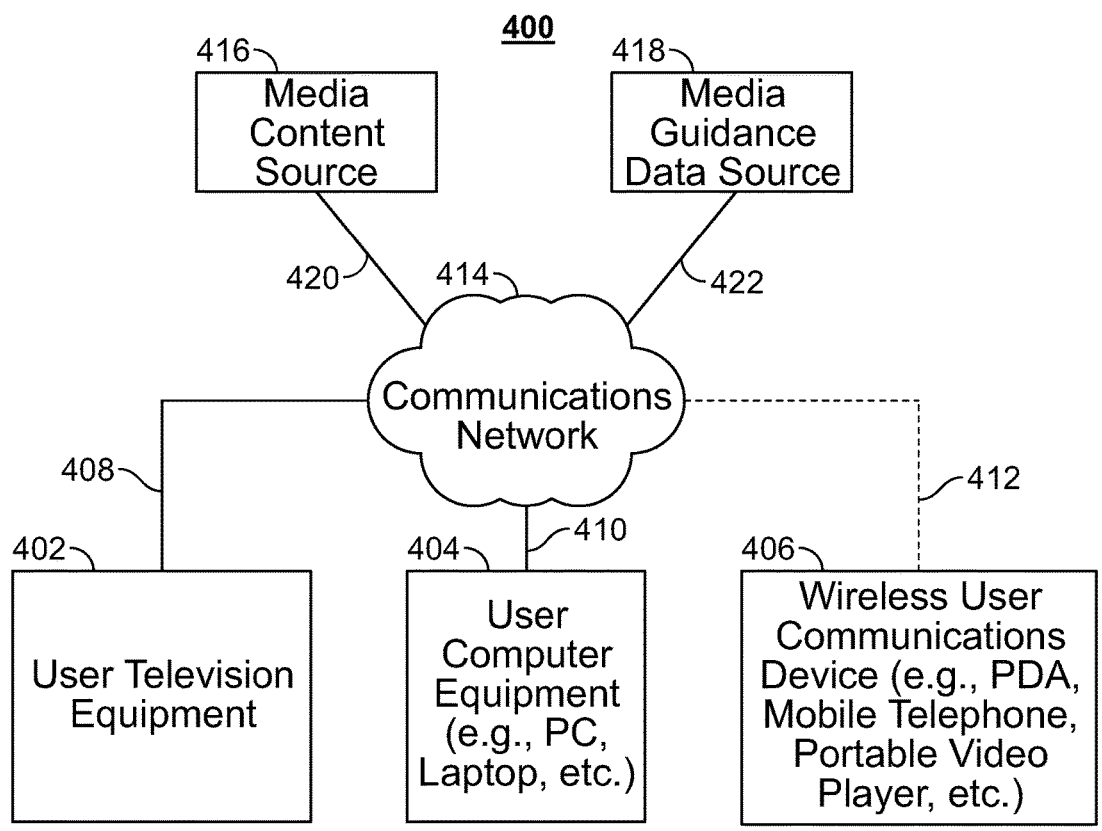
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
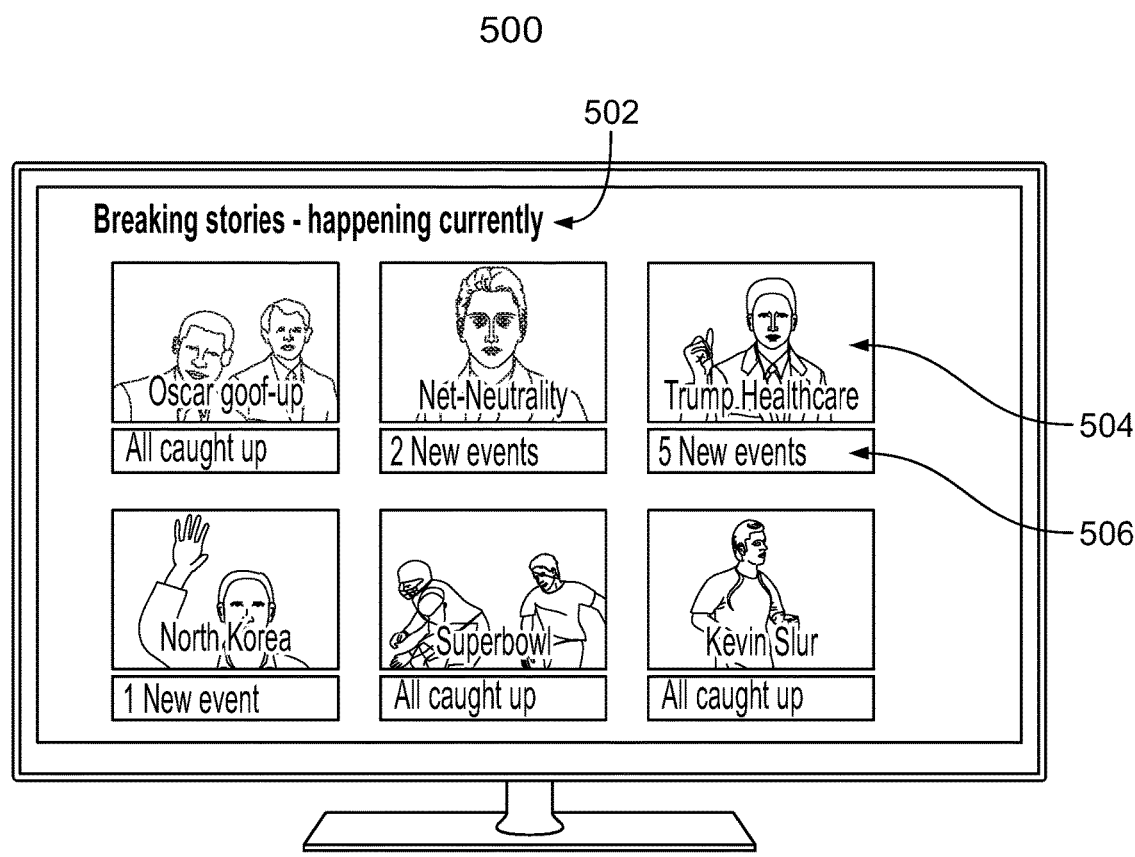
FIG. 5 is an illustrative display screen that depicts aggregated media assets of related content in accordance with some embodiments of the disclosure.

FIG. 5 is an illustrative display screen (e.g., as generated by a media guidance application implemented on user device 300 (FIG. 3)) that depicts aggregated media assets of related content. This display screen may be generated by control circuitry 304 (FIG. 3) as instructed by a media guidance application implemented on a user device (e.g., user equipment device 402, 404, and/or 406 (FIG. 4)). The title of the user interface is 502. The aggregated media asset is 504. A description or image associated to the aggregated media asset may be shown on 504. For example, if the aggregated media asset represents a news story about the Oscars, 504 may display an image of the trophy and may summarize the current developments. It contains extracted portions from the plurality of content streams. For example, it may display an image representing a general news story and the title of the news story. The user can click on 504 to view the extracted portions.

The aggregated media asset identifier is 506. It informs the user of the number of new extracted portions available for viewing. For example, if there is breaking news for a particular larger story, the aggregated media asset identifier may say "1 new event." The color of the media asset identifier may indicate whether the user still needs to access portions in the aggregated media asset. For example, if the user has viewed all the portions, the media identifier may have a green indicator. If the user has not viewed new portions, the media asset identifier may have a red indicator. In this case, the indicator may be, but is not limited to, font color, a colored outline of the media asset identifier, and a colored shape near the media asset identifier symbolizing that a notification is available. The media guidance application may alert the user on user television equipment 402, user computer equipment 404, or a wireless user communications device 406 (FIG. 4).

Figure 6:
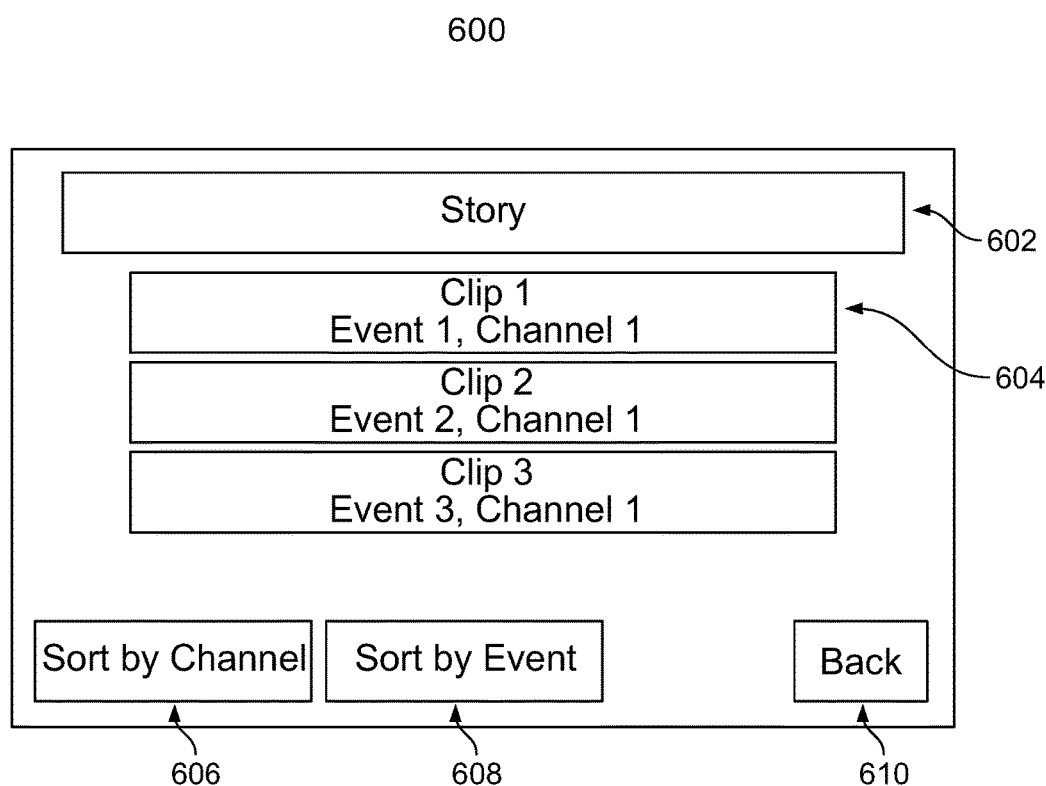
FIG. 6 is an illustrative display screen that may be used to view extracted portions in accordance with some embodiments of the disclosure.

FIG. 6 is an illustrative display screen that may be used to view extracted portions in accordance with some embodiments of the disclosure. This display screen may be generated by control circuitry 304 (FIG. 3) and may be accessed by clicking the aggregated media asset identifier through a user input interface 310 (FIG. 3) The aggregate media asset is 602. The extract portions are listed in 604 with the respective metadata. For example, if the aggregated media asset is the collection of news event video clips of the general news story "Oscars Mishap," the extracted portions can be identified based on their source (i.e., content streams like CNN, BBC, and ABC).

The button 606 allows the extracted portions to be sorted by their source. For example, a news story can be streamed by multiple news companies. If the user simply wants to view the news stories from a single news company, he/she can sort the aggregated media asset accordingly. The button 608 sorts the aggregated media asset based on the extracted portion's content. For example, if the single story "Oscars Best Motion Picture is Moonlight" is recorded from multiple content streams, the user may view all versions of the single story. Button 610 returns the user to the user interface described in FIG. 5.

Figure 7:
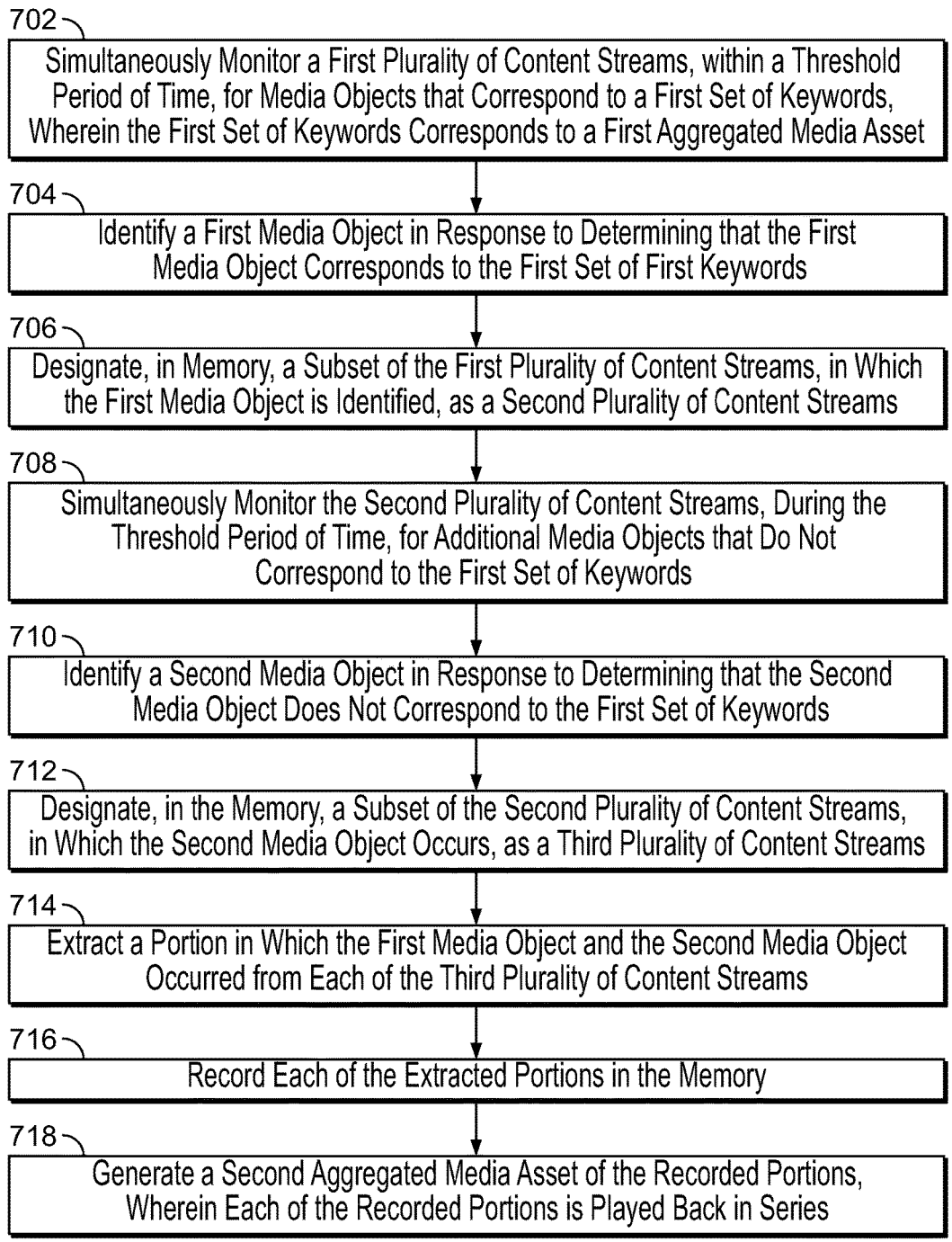
FIG. 7 is a flow chart of illustrative steps for generating aggregated media assets of related content in accordance with some embodiments of the disclosure.

FIG. 7 is a flowchart of illustrative steps for generating aggregated media assets of related content. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to generate aggregated media assets of related content. In addition, one or more steps of process 700 may be incorporated into or combined with one or more steps of any other process or embodiment (e.g., as described in relation to FIGS. 8-10)).

At step 702, the media guidance application simultaneously monitors a first plurality of content streams, within a threshold period of time, for media objects that correspond to a first set of keywords, wherein the first set of keywords corresponds to a first aggregated media asset. The first plurality of content streams may be accessed from the media content source 416 (FIG. 4). Monitoring may be carried out by control circuitry 304 (FIG. 3). The first set of keywords that correspond to the first aggregated media asset may originate from the media data guidance data source 418 (FIG. 4).

At step 704, the media guidance application identifies a first media object in response to determining that the first media object corresponds to the first set of keywords. The determination that the first media object corresponds to the first set of keywords is performed by control circuitry 304 (FIG. 3).

At step 706, the media guidance application designates, in memory, a subset of the first plurality of content streams, in which the first media object is identified, as a second plurality of content streams. For example, the media guidance application may select a section of the first plurality of content streams from the media content source 416 (FIG. 4) and identify the section as a second plurality of content streams in storage 308 (FIG. 3).

At step 708, the media guidance application simultaneously monitors the second plurality of content streams, during the threshold period of time, for additional media objects that do not correspond to the first set of keywords. The second plurality of content streams may be accessed from the media content source 416 (FIG. 4), with their identifier coming from storage 308 (FIG. 3). For example, if the media content source 416 features content streams from CNN News, ABC News, and NBC News, the process of 706 may designate CNN News and ABC News as a second plurality of content streams in storage 308. When monitoring the second plurality of content streams, control circuitry may be used to determine the designated content streams to monitor.

At step 710, the media guidance application identifies a second media object in response to determining that the second media object does not correspond to the first set of keywords. The determination that the second media object does not correspond to the first set of keywords is performed by control circuitry 304 (FIG. 3).

At step 712, the media guidance application designates, in the memory, a subset of the second plurality of content streams, in which the second media object occurs, as a third plurality of content streams. For example, the media guidance application may select a section of the second plurality of content streams from the media content source 416 (FIG. 4) and identify the section as a third plurality of content streams in storage 308 (FIG. 3).

At step 714, the media guidance application extracts a portion in which the first media object and the second media object occurred from each of the third plurality of content streams. For example, using control circuitry 304 (FIG. 3), the media guidance application may extract video clips that belong to the third plurality of content streams (e.g., CNN News stream, ABC News stream, etc.) and contain occurrences of the first and second media object, respectively.

At step 716, the media guidance application records each of the extracted portions in the memory. The media guidance application may use storage 308 (FIG. 3) to store the extracted portions.

Finally, at step 718, the media guidance application generates a second aggregated media asset of the recorded portions, wherein each of the recorded portions is played back in series. The second aggregated media asset of the recorded portions may be shown on display 312 and may be accessed through the user input interface 310 (FIG. 3). This is further described in FIG. 5.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
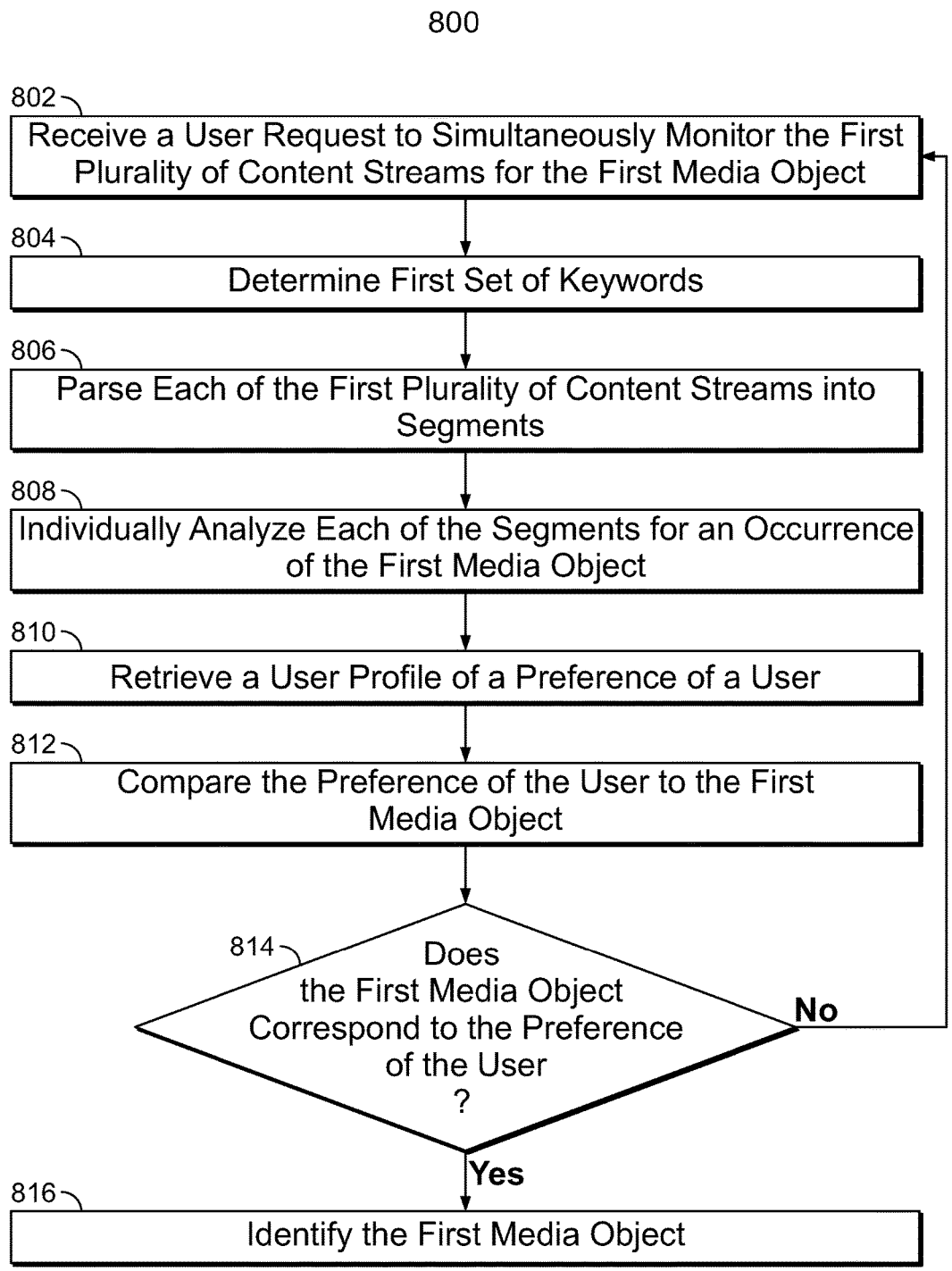
FIG. 8 is a flow chart of illustrative steps for identifying the first media object in accordance with some embodiments of the disclosure.

FIG. 8 is a flowchart of illustrative steps for identifying the first media object. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment device 402, 404, and/or 406 (FIG. 4)) in order to identify the first media object. In addition, one or more steps of process 800 may be incorporated into or combined with one or more steps of any other process or embodiment (e.g., as described in relation to FIGS. 7 and 9-10)).

At step 802, the media guidance application receives (e.g., via I/O path 302 (FIG. 3)) a user request to simultaneously monitor the first plurality of content streams for the first media object. The media guidance application may receive this user request from a variety of sources including user television equipment 402, user computer equipment 404, or wireless user communications device 406 (FIG. 4). In order to monitor the first plurality of content streams, which may originate from the media content source 416 (FIG. 4), the user may also send a user request from the user input interface 310 to the control circuitry 304 (FIG. 3).

At step 804, the media guidance application determines (e.g., via control circuitry 304 (FIG. 3)) a first set of keywords. Control circuitry 304 (FIG. 3) may be used to determine the first set of keywords that are associated to the first media object. For example, the user may request the media guidance application to simultaneously monitor for a first media object. Suppose the first media object the media guidance application monitors is "FC Barcelona Star Messi" in step 802. In step 804, the media guidance application may determine the first set of keywords that are associated to the first media object, such as "Lionel Messi," "Barcelona," "football," and "Ronaldo."

At step 806, the media guidance application parses each of the first plurality of content streams into segments. Control circuitry 304 (FIG. 3) may be used to parse the plurality of content streams into segments. For example, a content stream may feature an entire news show with multiple stories. The media guidance application may parse the content stream into different story segments.

At step 808, the media guidance application individually analyzes each of the segments for an occurrence of the first media object. Control circuitry 304 (FIG. 3) may be used to analyze each of the segments. For example, the media guidance application may look for an occurrence of "FC Barcelona Star Messi" in the different story segments.

At step 810, the media guidance application retrieves from a user profile a preference of a user. The user profile may be retrieved from storage 308 (FIG. 3).

At step 812, the media guidance application compares the preference of the user to the first media object. Control circuitry 304 (FIG. 3) may be used to compare the preference of the user to the first media object. Suppose the user prefers to view sports games and typically avoids content related to movies and award shows. The media guidance application may determine that the preference of the user corresponds to the first media object "FC Barcelona Star Messi" and does not correspond to a media object such as "Oscars Best Picture Error."

If at step 814 the media guidance application determines that the first media object corresponds to the preference of the user, the media guidance application identifies the first media object in step 816. For example, if the user prefers sports, the first media object may be identified as "FC Barcelona Star Messi" and the first aggregated media asset may consist of updates regarding Lionel Messi's progress throughout a game or a season. If the user does not prefer sports stories, the media guidance application may return to step 802 and monitor for a different media object occurring in the plurality of content streams.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

Figure 9:
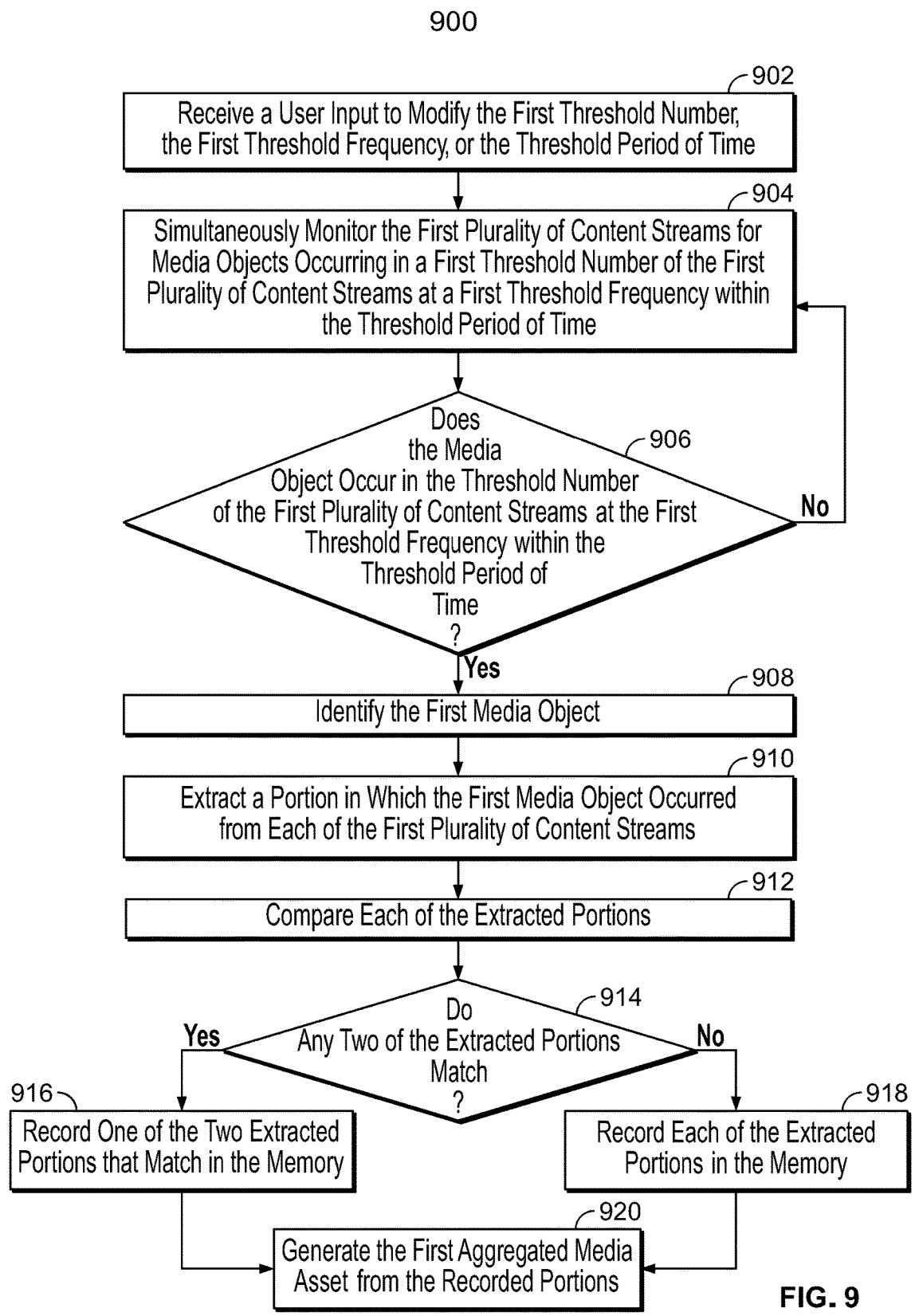
FIG. 9 is a flow chart of illustrative steps for generating an aggregated media asset from recorded portions in accordance with some embodiments of the disclosure.

FIG. 9 is a flowchart of illustrative steps for generating an aggregated media asset from recorded portions. It should be noted that process 900 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment device 402, 404, and/or 406 (FIG. 4)) in order to generate the aggregated media asset from recorded portions. In addition, one or more steps of process 900 may be incorporated into or combined with one or more steps of any other process or embodiment (e.g., as described in relation to FIGS. 7-8 and 10)).

At step 902, the media guidance application receives a user input to modify the first threshold number, the first threshold frequency, or the threshold period of time. The media guidance application may receive this user input from a variety of sources including user television equipment 402, user computer equipment 404, or wireless user communications device 406 (FIG. 4). In order to monitor the first plurality of content streams, which may originate from the media content source 416 (FIG. 4), the user may also send a user request from the user input interface 310 to the control circuitry 304 (FIG. 3).

At step 904, the media guidance application simultaneously monitors the first plurality of content streams for media objects occurring in a first threshold number of the first plurality of content streams at a first threshold frequency within the threshold period of time. The values of the first threshold frequency, first threshold number and the threshold period of time may be retrieved from storage 308 (FIG. 3) in order to monitor for media objects.

At step 906, the media guidance application determines whether a media object occurs in the threshold number of the first plurality of content streams at the first threshold frequency within the threshold period of time. If it does, the media guidance application identifies the first media object in step 908. Otherwise the media guidance application reverts to step 904. Control circuitry 304 (FIG. 3) may be used to determine whether the media object meets the threshold parameters. Suppose the media object is "FC Barcelona Star Messi," the threshold number is two, the threshold frequency is three, and the threshold period of time is one hour. If the media guidance application determines that the media object occurs in at least two content streams and appears at least three times within one hour, the media object may be identified as the first media object. If the media object does not meet the threshold parameters, the media guidance application may monitor the first plurality of content streams for another media object.

At step 910, the media guidance application extracts a portion in which the first media object occurred from each of the first plurality of content streams. For example, using control circuitry 304 (FIG. 3), the media guidance application may extract video clips from the first plurality of content streams (e.g. CNN News stream, ABC News stream, etc.) and contain occurrences of the first media object.

At step 912, the media guidance application compares each of the extracted portions. Control circuitry 304 (FIG. 3) may perform the comparison to determine if the extracted portions match. If any two of the extracted portions match in 914, the media guidance application records one of the two extracted portions that match in the memory in step 916. If no two extracted portions match, both extracted portions are recorded in memory in 918. The extracted portions may be placed in storage 308 of control circuitry 304 (FIG. 3). For example, if two extracted portions such as video clips match, this may indicate that the video clips are duplicates. In the case of a news show, one of the video clips may be a re-run of a news report.

Finally, at step 920 the media guidance application generates the first aggregated media asset from the recorded portions. The first aggregated media asset of the recorded portions may be shown on display 312 and may be accessed through the user input interface 310 (FIG. 3). This is further described in FIG. 5. The record portions may also be displayed on the user input interface 310 (FIG. 3) as described further in FIG. 6.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
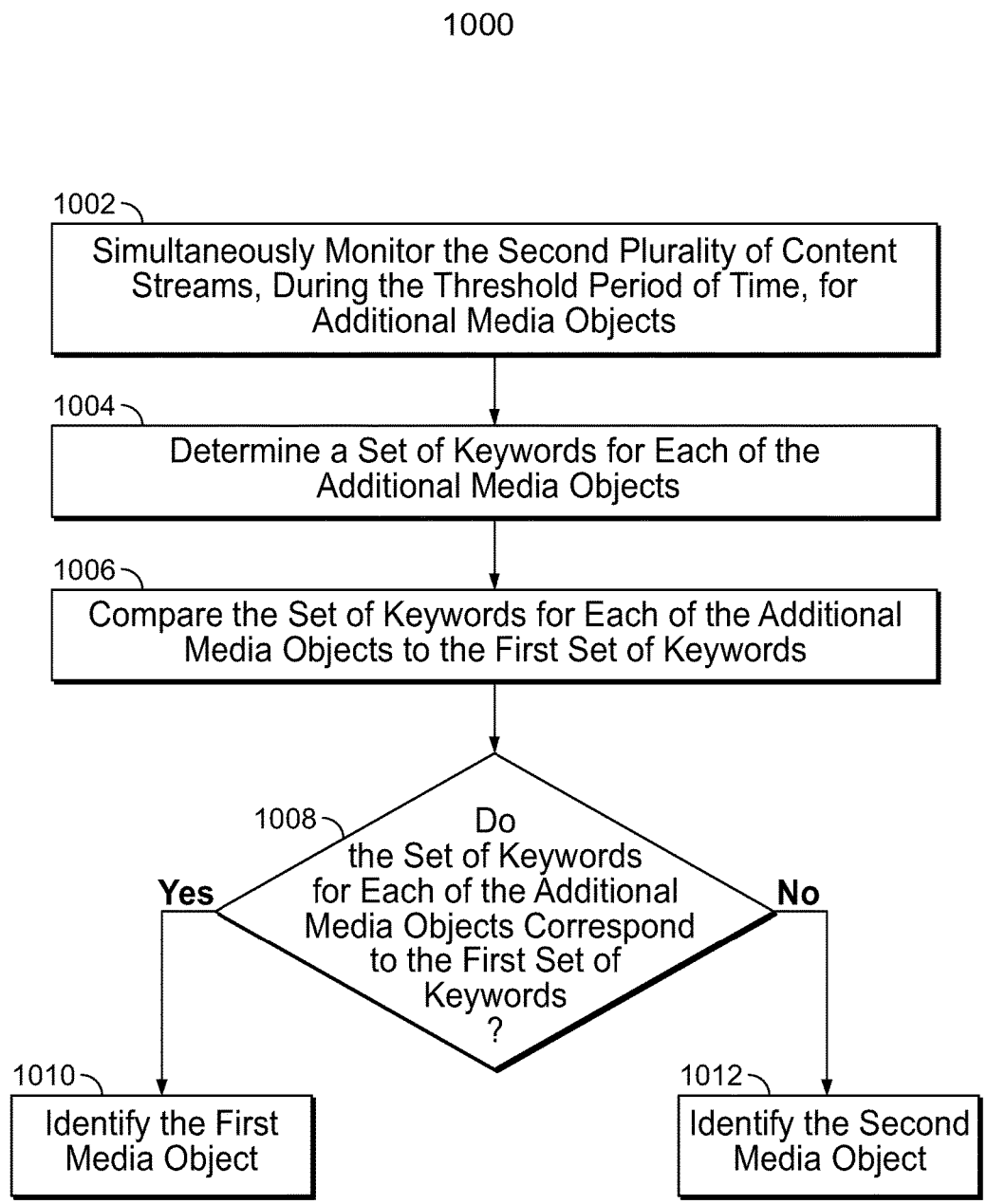
FIG. 10 is a flow chart of illustrative steps for identifying additional media assets based on keywords in accordance with some embodiments of the disclosure.

FIG. 10 is a flowchart of illustrative steps for identifying additional media assets based on keywords. It should be noted that process 1000 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to identify additional media assets based on keywords. In addition, one or more steps of process 1000 may be incorporated into or combined with one or more steps of any other process or embodiment (e.g., as described in relation to FIGS. 7-9)).

At step 1002, the media application simultaneously monitors the second plurality of content streams, during the threshold period of time, for additional media objects. The media guidance application may employ control circuitry 304 (FIG. 3) to monitor the second plurality of content streams which may originate from the media content source (FIG. 4).

At step 1004, the media guidance application determines a set of keywords for each of the additional media objects. Control circuitry 304 (FIG. 3) may be used to determine a set of keywords for each additional media object. For example, new updates may develop for a particular news story or a non-related news story may emerge. Accordingly, a set of keywords is needed to determine whether the story is related to one that is being tracked, or whether it is a new story.

At step 1006, the media guidance application compares the set of keywords for each of the additional media objects to the first set of keywords. This may be performed using control circuitry 304 (FIG. 3). For example, a set of keywords that corresponds to the first set of keywords may indicate the additional media object is the same as the first media object. This may further indicate that the extracted portions may match, as described in step 912 (FIG. 9).

If in step 1008, the media guidance application determines that the set of keywords for each of the additional media objects corresponds to the first set of keywords, the media guidance application identifies the first media object in step 1010. Control circuitry 304 (FIG. 3) may be used to determine that the set of keywords correspond. Furthermore, if there is a correspondence between the first set of keywords and additional sets of the keywords, the media guidance application may determine that the additional media object is simply the first media object. If a correspondence does not exist, the media guidance application then identifies the additional media object as the second media object in step 1012. For example, in a news story, this may indicate that the additional media object is an update to the story.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
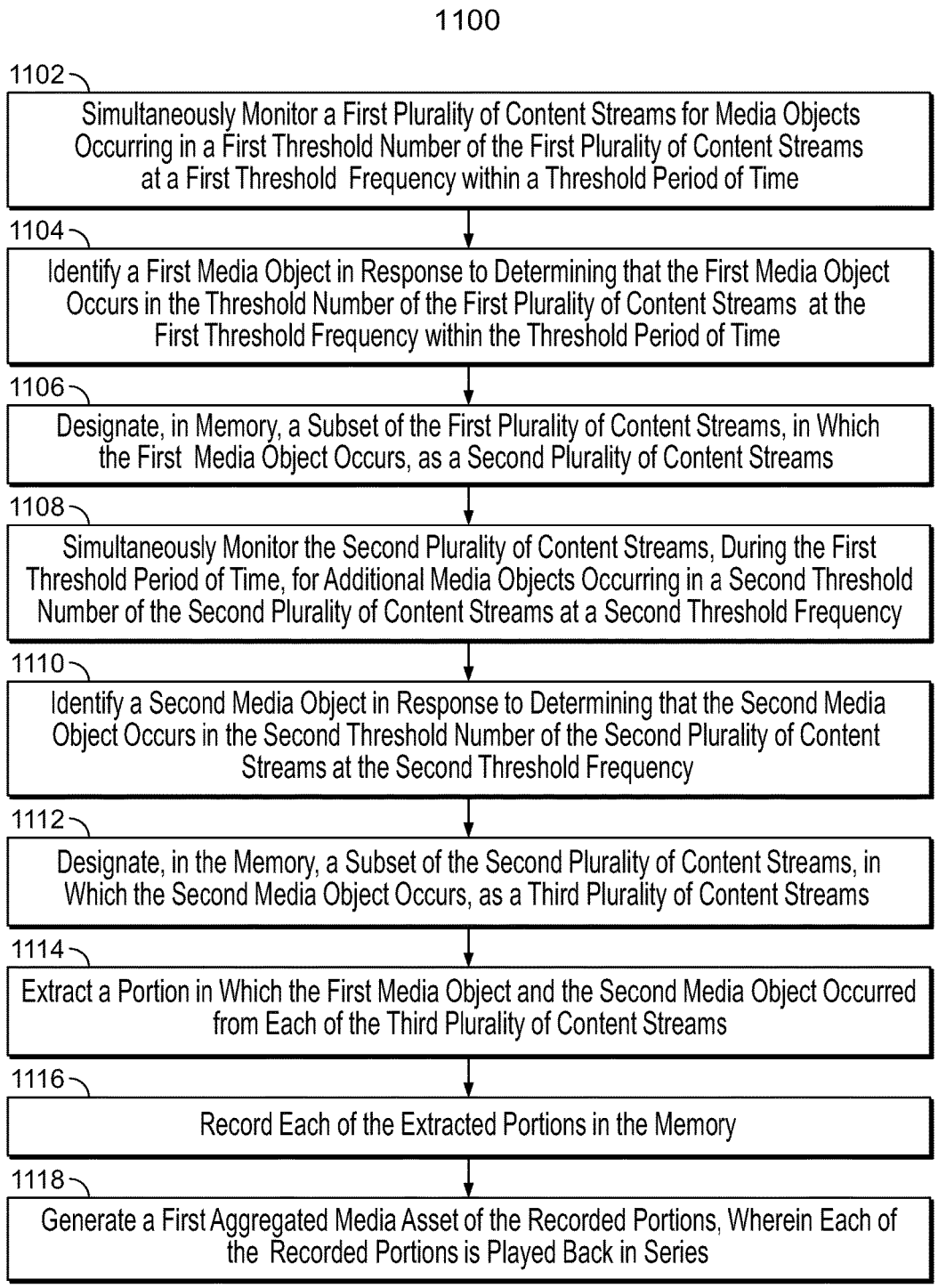
FIG. 11 is a flow chart of illustrative steps for generating aggregated media assets of related content in accordance with some embodiments of the disclosure.

FIG. 11 is a flowchart of illustrative steps for generating aggregated media assets of related content. It should be noted that process 1100 or any step thereof could be performed on, or provided by, any of the devices shown in FIGS. 3-4. For example, process 1100 may be executed by control circuitry 304 (FIG. 3) as instructed by a media guidance application implemented on a user device (e.g., user equipment devices 402, 404, and/or 406 (FIG. 4)) in order to generate aggregated media assets of related content. In addition, one or more steps of process 1100 may be incorporated into or combined with one or more steps of any other process or embodiment (e.g., as described in relation to FIGS. 8-10)).

At step 1102, the media guidance application simultaneously monitors a first plurality of content streams for media objects occurring in a first threshold number of the first plurality of content streams at a first threshold frequency within a threshold period of time. The first plurality of content streams may be accessed from the media content source 416 (FIG. 4). Monitoring may be carried out by control circuitry 304 (FIG. 3). The values of the first threshold frequency, first threshold number and the threshold period of time may be retrieved from storage 308 (FIG. 3) in order to monitor for media objects.

At step 1104, the media guidance application identifies a first media object in response to determining that the first media object occurs in the threshold number of the first plurality of content streams at the first threshold frequency within the threshold period of time. The determination that the first media object satisfies the first threshold parameters (first threshold number, first threshold frequency, threshold period of time) is performed by control circuitry 304 (FIG. 3).

At step 1106, the media guidance application designates, in memory, a subset of the first plurality of content streams, in which the first media object is identified, as a second plurality of content streams. For example, the media guidance application may select a section of the first plurality of content streams from the media content source 416 (FIG. 4) and identify the section as a second plurality of content streams in storage 308 (FIG. 3).

At step 1108, the media guidance application simultaneously monitors the second plurality of content streams, during the first threshold period of time, for additional media objects occurring in a second threshold number of the second plurality of content streams at a second threshold frequency. The second plurality of content streams may be accessed from the media content source 416 (FIG. 4), with their identifier coming from storage 308 (FIG. 3). For example, if the media content source 416 features content streams from CNN News, ABC News, and NBC News, the process of 1106 may designate CNN News and ABC News as a second plurality of content streams in storage 308. When monitoring the second plurality of content streams, control circuitry may be used to determine the designated content streams to monitor.

At step 1110, the media guidance application identifies a second media object in response to determining that the second media object occurs in the second threshold number of the second plurality of content streams at the second threshold frequency. The determination that the second media object does not satisfy the second threshold parameters (second threshold number, second threshold frequency, threshold period of time) is performed by control circuitry 304 (FIG. 3).

At step 1112, the media guidance application designates, in the memory, a subset of the second plurality of content streams, in which the second media object occurs, as a third plurality of content streams. For example, the media guidance application may select a section of the second plurality of content streams from the media content source 416 (FIG. 4) and identify the section as a third plurality of content streams in storage 308 (FIG. 3).

At step 1114, the media guidance application extracts a portion in which the first media object and the second media object occurred from each of the third plurality of content streams. For example, using control circuitry 304 (FIG. 3), the media guidance application may extract video clips that belong to the third plurality of content streams (e.g. CNN News stream, ABC News stream, etc.) and contain occurrences of the first and second media object, respectively.

At step 1116, the media guidance application records each of the extracted portions in the memory. The media guidance application may use storage 308 (FIG. 3) to store the extracted portions.

Finally, at step 1118, the media guidance application generates a first aggregated media asset of the recorded portions, wherein each of the recorded portions is played back in series. The first aggregated media asset of the recorded portions may be shown on display 312 and may be accessed through the user input interface 310 (FIG. 3). This is further described in FIG. 5.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of generating aggregated media assets on related content from different sources, comprising:
    simultaneously monitoring, using control circuitry, a first plurality of content streams for media objects occurring in a first threshold number of the first plurality of content streams at a first threshold frequency within a threshold period of time;
    identifying, using the control circuitry, a first media object in response to determining that the first media object occurs in the threshold number of the first plurality of content streams at the first threshold frequency within the threshold period of time;
    designating, in memory, a subset of the first plurality of content streams, in which the first media object occurs, as a second plurality of content streams;
    simultaneously monitoring, using the control circuitry, the second plurality of content streams, during the first threshold period of time, for additional media objects occurring in a second threshold number of the second plurality of content streams at a second threshold frequency;
    identifying, using the control circuitry, a second media object in response to determining that the second media object occurs in the second threshold number of the second plurality of content streams at the second threshold frequency;
    designating, in the memory, a subset of the second plurality of content streams, in which the second media object occurs, as a third plurality of content streams;
    extracting, using the control circuitry, a portion in which the first media object and the second media object occurred from each of the third plurality of content streams;
    recording, using the control circuitry, each of the extracted portions in the memory; and
    generating, using the control circuitry, a first aggregated media asset of the recorded portions, wherein each of the recorded portions is played back in series.

2. The method of claim 1, wherein the first plurality of content streams corresponds to a plurality of streaming media assets, and wherein the first media object is a video data, image data, audio data, or textual data included with one of the plurality of streaming media assets.

3. The method of claim 2, further comprising:
    simultaneously monitoring a third plurality of content streams for the media objects occurring in the first threshold number of the third plurality of content streams at the first threshold frequency within the threshold period of time;
    identifying a third media object in response to determining that the third media object occurs in the threshold number of the third plurality of content streams at the third threshold frequency within the threshold period of time;
    designating, in the memory, a subset of the third plurality of content streams, in which the third media object occurs, as a fourth plurality of content streams;
    simultaneously monitoring the fourth plurality of content streams, during the first threshold period of time, for additional media objects occurring in a fourth threshold number of the fourth plurality of content streams at a fourth threshold frequency;
    identifying a fourth media object in response to determining that the fourth media object occurs in the fourth threshold number of the fourth plurality of content streams at the fourth threshold frequency;
    designating, in the memory, a subset of the fourth plurality of content streams, in which the fourth media object occurs, as a fifth plurality of content streams;
    extracting a portion in which the third media object and the fourth media object occurred from each of the fifth plurality of content streams;
    recording, in the memory, each of the portions extracted from the fifth plurality of content streams;
    generating a second aggregated media asset of the recorded portions extracted from the fifth plurality of content streams, wherein each of the recorded portions extracted from the fifth plurality of content streams is played back in series; and
    generating for simultaneous display, on a display device, the first aggregated media asset and the second aggregated media asset in a user interface.

4. The method of claim 2, further comprising:
    determining a location in the user interface of the first aggregated media asset;
    generating a first aggregated media asset identifier for the first aggregated media asset, wherein the first aggregated media asset identifier corresponds to the first media object; and
    generating for display, on the display device, the first aggregated media asset identifier in the user interface.

5. The method of claim 2, further comprising
    retrieving a user profile of a preference of a user;
    comparing the preference of the user to the first media object; and
    in response to determining that the first media object corresponds to the preference, identifying the first media object.

6. The method of claim 2, wherein simultaneously monitoring the first plurality of content streams for media objects further comprises:
    parsing each of the first plurality of content streams into segments; and
    individually analyzing each of the segments for an occurrence of the first media object.

7. The method of claim 2, further comprising:
    receiving a user request to simultaneously monitor the first plurality of content streams for the first media object; and
    in response to the user request, setting the first threshold number equal to one.

8. The method of claim 2, further comprising:
    receiving a user request to simultaneously monitor the first plurality of content streams for the first media object; and
    in response to the user request, setting the first threshold frequency equal to one.

9. The method of claim 2, further comprising receiving a user input to modify the first threshold number, the first threshold frequency, or the threshold period of time.

10. The method of claim 2, wherein recording each of the extracted portions, further comprises:
comparing each of the extracted portions;
determining whether any two of the extracted portions match; and
in response to determining that any two of the extracted portions match, not recording one of the two extracted portions that match.

11. A system of generating aggregated media assets on related content from different sources, comprising:
memory configured to:
store designations of subsets of content streams; and
store recorded portions of content streams;
control circuitry configured to:
simultaneously monitor a first plurality of content streams for media objects occurring in a first threshold number of the first plurality of content streams at a first threshold frequency within a threshold period of time;
identify a first media object in response to determining that the first media object occurs in the threshold number of the first plurality of content streams at the first threshold frequency within the threshold period of time;
designate, in the memory, a subset of the first plurality of content streams, in which the first media object occurs, as a second plurality of content streams;
simultaneously monitor the second plurality of content streams, during the first threshold period of time, for additional media objects occurring in a second threshold number of the second plurality of content streams at a second threshold frequency;
identify a second media object in response to determining that the second media object occurs in the second threshold number of the second plurality of content streams at the second threshold frequency;
designate, in the memory, a subset of the second plurality of content streams, in which the second media object occurs, as a third plurality of content streams;
extract a portion in which the first media object and the second media object occurred from each of the third plurality of content streams;
record each of the extracted portions in the memory; and
generate a first aggregated media asset of the recorded portions, wherein each of the recorded portions is played back in series.

12. The system of claim 11, wherein the first plurality of content streams corresponds to a plurality of streaming media assets, and wherein the first media object is a video data, image data, audio data, or textual data included with one of the plurality of streaming media assets.

13. The system of claim 12, wherein the control circuitry is further configured to:
simultaneously monitor a third plurality of content streams for the media objects occurring in the first threshold number of the third plurality of content streams at the first threshold frequency within the threshold period of time;
identify a third media object in response to determining that the third media object occurs in the threshold number of the third plurality of content streams at the third threshold frequency within the threshold period of time;
designate, in the memory, a subset of the third plurality of content streams, in which the third media object occurs, as a fourth plurality of content streams;
simultaneously monitor the fourth plurality of content streams, during the first threshold period of time, for additional media objects occurring in a fourth threshold number of the fourth plurality of content streams at a fourth threshold frequency;
identify a fourth media object in response to determining that the fourth media object occurs in the fourth threshold number of the fourth plurality of content streams at the fourth threshold frequency;
designate, in the memory, a subset of the fourth plurality of content streams, in which the fourth media object occurs, as a fifth plurality of content streams;
extract a portion in which the third media object and the fourth media object occurred from each of the fifth plurality of content streams;
recording, in the memory, each of the portions extracted from the fifth plurality of content streams;
generate a second aggregated media asset of the recorded portions extracted from the fifth plurality of content streams, wherein each of the recorded portions extracted from the fifth plurality of content streams is played back in series; and
generate for simultaneous display, on a display device, the first aggregated media asset and the second aggregated media asset in a user interface.

14. The system of claim 12, wherein the control circuitry is further configured to:
determine a location in the user interface of the first aggregated media asset;
generate a first aggregated media asset identifier for the first aggregated media asset, wherein the first aggregated media asset identifier corresponds to the first media object; and
generate for display, on the display device, the first aggregated media asset identifier in the user interface.

15. The system of claim 12, wherein the control circuitry is further configured to:
retrieve a user profile of a preference of a user;
compare the preference of the user to the first media object; and
in response to determining that the first media object corresponds to the preference, identify the first media object.

16. The system of claim 12, wherein simultaneously monitoring the first plurality of content streams for media objects further comprises:
parsing each of the first plurality of content streams into segments; and
individually analyzing each of the segments for an occurrence of the first media object.

17. The system of claim 12, wherein the control circuitry is further configured to:
receive a user request to simultaneously monitor the first plurality of content streams for the first media object; and
in response to the user request, set the first threshold number equal to one.

18. The system of claim 12, wherein the control circuitry is further configured to:
receive a user request to simultaneously monitor the first plurality of content streams for the first media object; and
in response to the user request, set the first threshold frequency equal to one.

19. The system of claim 12, wherein the control circuitry is further configured to receive a user input to modify the first threshold number, the first threshold frequency, or the threshold period of time.

20. The system of claim 12, wherein recording each of the extracted portions, further comprises:
   comparing each of the extracted portions;
   determining whether any two of the extracted portions match; and
   in response to determining that any two of the extracted portions match, not recording one of the two extracted portions that match.

* * * * *